Jan. 22, 1952     M. E. McCLELLAN     2,583,383
SIDE DELIVERY RAKE AND FRAME THEREFOR
Filed Oct. 15, 1949     3 Sheets-Sheet 1
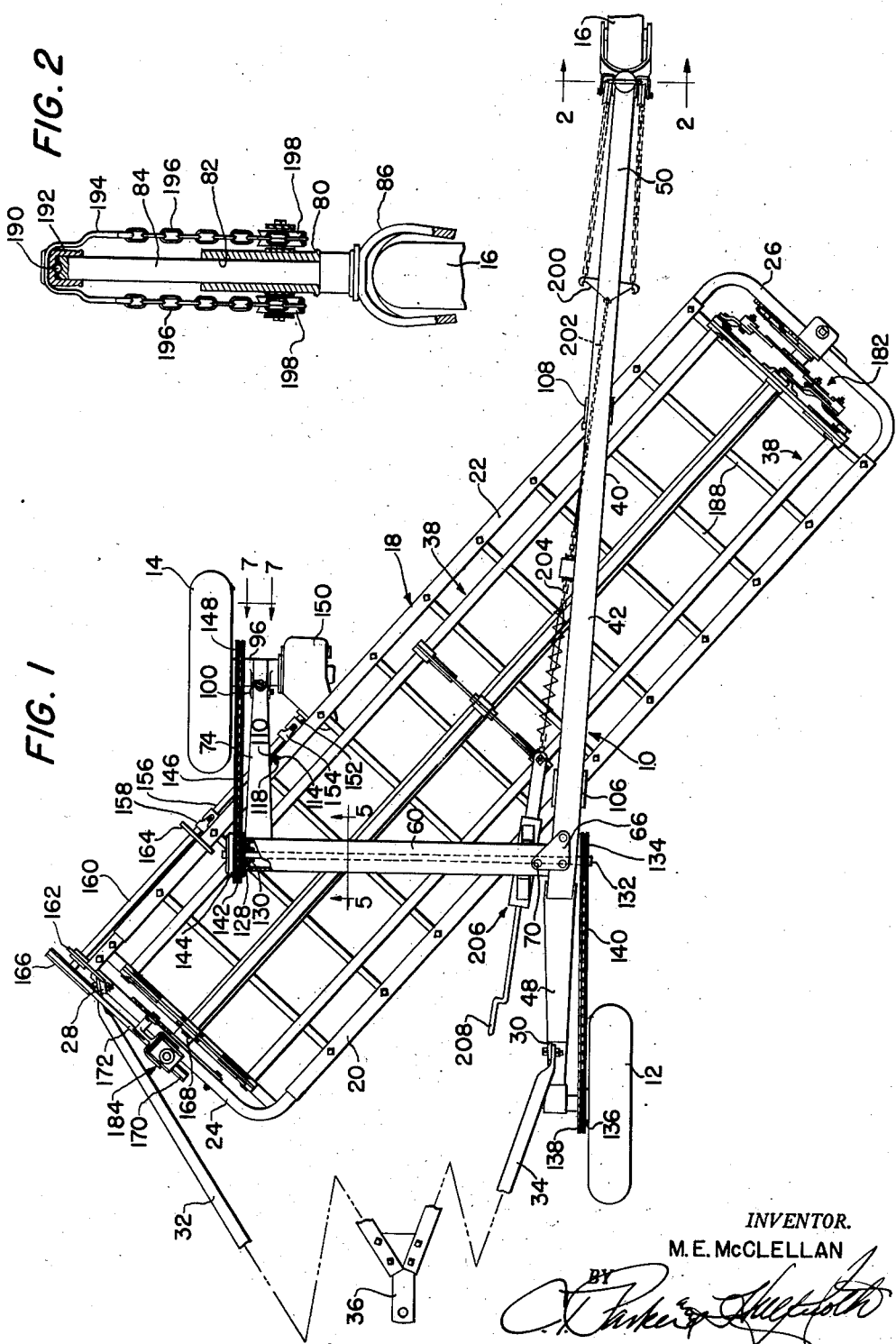
INVENTOR.
M. E. McCLELLAN
ATTORNEYS Jan. 22, 1952    M. E. McCLELLAN    2,583,383
SIDE DELIVERY RAKE AND FRAME THEREFOR
Filed Oct. 15, 1949    3 Sheets-Sheet 2
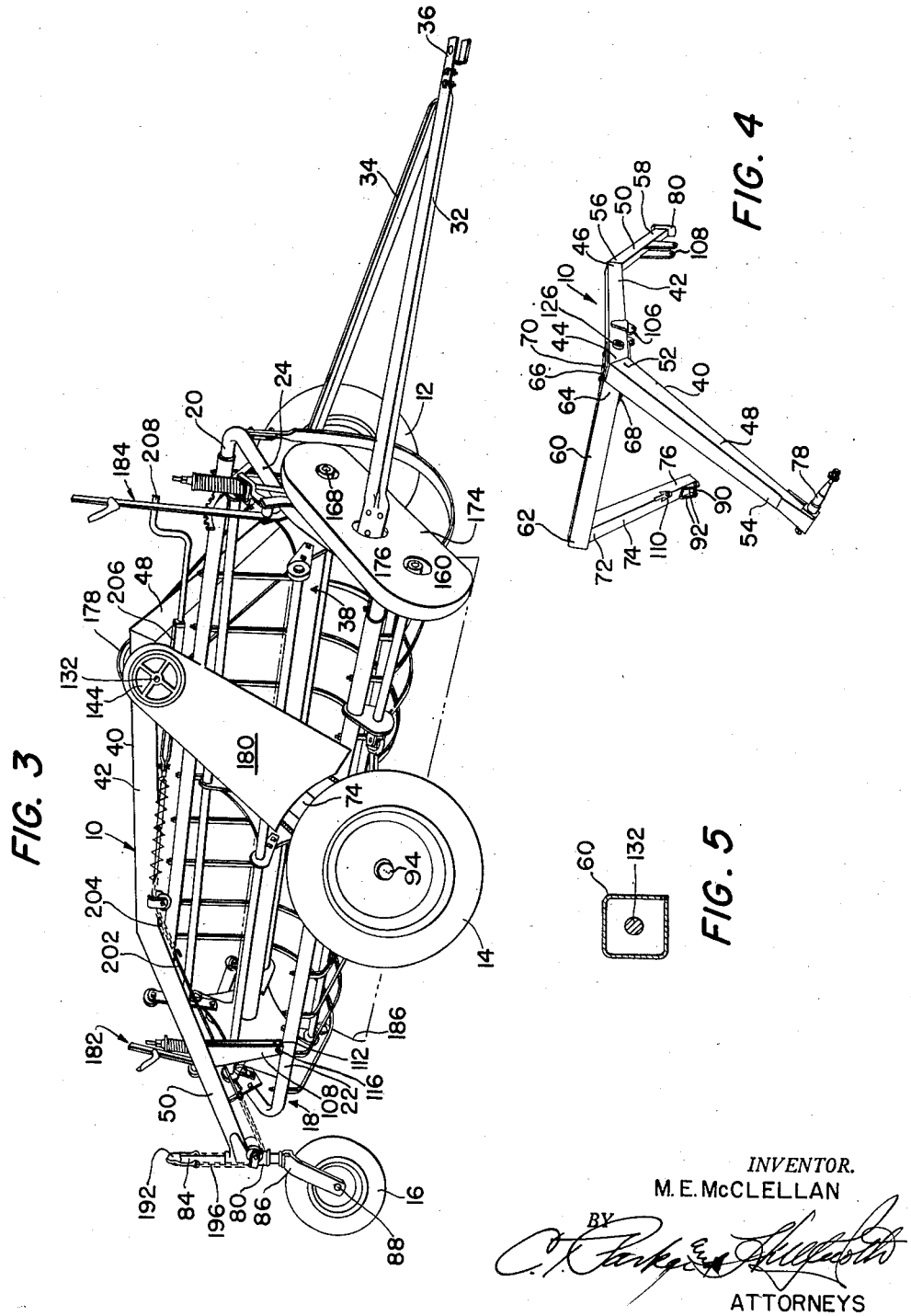
INVENTOR.
M. E. McCLELLAN
ATTORNEYS Jan. 22, 1952 M. E. McCLELLAN 2,583,383
SIDE DELIVERY RAKE AND FRAME THEREFOR
Filed Oct. 15, 1949 3 Sheets-Sheet 3
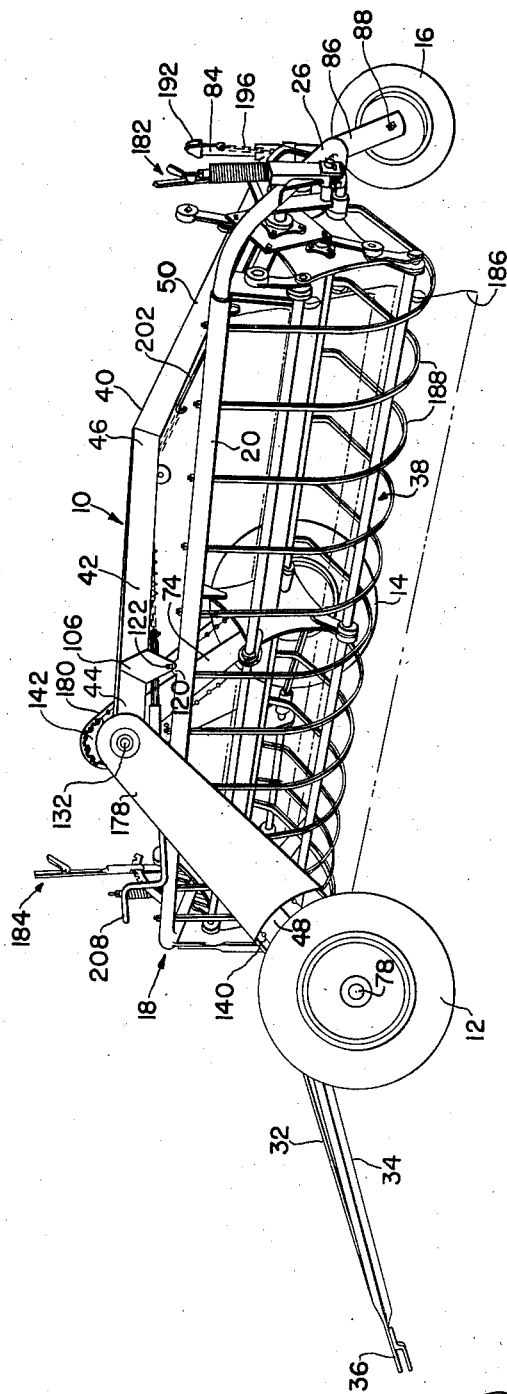
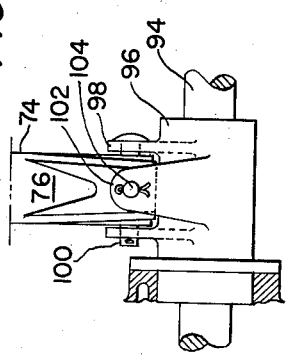
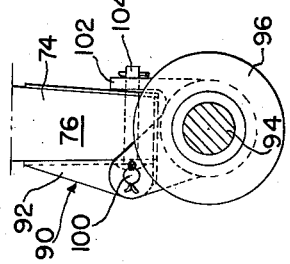
INVENTOR.
M.E. McCLELLAN
BY
ATTORNEYS Patented Jan. 22, 1952

2,583,383

UNITED STATES PATENT OFFICE 2,583,383

SIDE DELIVERY RAKE AND FRAME THEREFOR

Marcus E. McClellan, Ottumwa, Iowa, assignor to Deere Manufacturing Co., Dubuque, Iowa, a corporation of Iowa Application October 15, 1949, Serial No. 121,513

15 Claims. (Cl. 56—377)

This invention relates to a side delivery rake and main frame structure therefor, and more particularly to a side delivery rake having laterally spaced and longitudinally offset front wheels and a rear or trailing caster wheel.

The conventional side rake of the type that is wholly supported on its own wheels and drawn by a tractor or other source of draft power comprises a longitudinal main frame carried on a pair of laterally spaced, coaxial front wheels and one or more trailing or rear caster wheels. The main frame suspends a reel frame which is diagonal to the line of travel, the reel frame and the rotatable reel carried thereby being ordinarily arranged to windrow to the left. Although such conventional design is satisfactory in general, it is found that it has a few disadvantages, one of which is the inefficiency of the rake on turns. That is to say, the conventional rake whips on sharp turns and the windrows are not uniform.

According to the present invention, the front carrying wheels are staggered or longitudinally offset. Specifically, the left-hand wheel is ahead of the right-hand wheel and the single rear caster wheel is in longitudinal alinement with the left-hand wheel. The reel frame is disposed diagonally to the line of travel and carries a rotatable reel for windrowing to the left, in this respect functioning much in the manner of the conventional rake. However, it is found that the staggered wheel arrangement causes the rake to form consistently uniform windrows, even on sharp turns. This results from the fact that the wheels, being off center, or staggered, will not pivot about a turning center as will the conventional coaxial wheels. For example, in the making of a left turn, the right-hand wheel, being laterally spaced from and in trailing relationship to the left-hand wheel creates frictional resistance between itself and the ground which causes the rake to follow the tractor without whipping.

Another feature of the invention resides in the improved frame construction which is essentially of three-legged design, each leg carrying a wheel. Specifically, the frame is upwardly arched so that the reel frame may be disposed therebelow. The reel frame is arranged so that it is diagonal to the direction of travel and so that it extends forwardly and to the right between the staggered front wheels and rearwardly and to the left just ahead of the caster wheel. It is found that this arrangement gives the maximum open area at the left-hand side of the machine, which is essential for the maximum delivery of hay to a windrow.

A still further object of the invention resides in the provision of improved draft means for the rake. The leg portion of the frame that carries the forward left-hand wheel is generally in transverse alinement with a forward corner portion of the reel-carrying frame and the draft means is connected to these two points and comprises a pair of forwardly extending bars which converge at a hitch point lying substantially on the longitudinal centerline between the pair of front wheels.

Still further objects of the invention reside in the provision of improved means for suspending the reel frame from the main frame; improved means for driving the rotatable reel; and means for housing or shielding the drive parts while accommodating structural parts of the rake.

The foregoing and other important objects and desirable features inherent in and encompassed by the invention will become apparent to those skilled in the art as a preferred embodiment is fully disclosed in the following detailed description and accompanying sheets of drawings, in which Figure 1 is a top plan view of the rake;

Figure 2 is an enlarged sectional view, taken substantially on the line 2—2 of Figure 1, showing the caster wheel mounting;

Figure 3 is a perspective view taken from the right-hand side of the machine;

Figure 4 is a perspective view of the main frame itself;

Figure 5 is an enlarged transverse sectional view taken substantially on the line 5—5 of Figure 1;

Figure 6 is a perspective view of the rake from its left-hand side;

Figure 7 is an enlarged view of the detail of mounting the right-hand front wheel, the view being taken generally as indicated by the line 7—7 in Figure 1; and Figure 8 is an end elevational view of the structure shown in Figure 7.

The rake has a main frame 10 sustained by three wheels 12, 14 and 16 for forward travel over the ground. The main frame 10 suspends a reel frame 18 which is disposed diagonally to the line of travel and which is of rectangular shape as viewed from above, having its long dimension crosswise of the direction of travel. The reel frame comprises a front or leading member 20, a rear or trailing member 22, a right-hand end member 24 and a left-hand end member 26. The reel frame is provided substantially at the corner formed by the junction of the members 20 and 24 with a connection element in the form of a bracket 28 which is generally in transverse alinement with a connection element in the form of a bracket 30 at the forward end of the main frame 10. These two brackets provide means for connection to transversely space-apart elements formed by the rear ends of a pair of forwardly converging draft members 32 and 34, the forward ends of which are joined to a draft-connection element in the form of a hitch plate 36. The draft means provides for connection of the rake to a tractor or equivalent source of draft power. As will be hereinafter more fully brought out, the tread or lateral spacing between the wheels 12 and 14 is substantially that of the conventional agricultural tractor.

As best seen in Figure 1, the diagonal reel frame 18 is so disposed that it is ahead of both the wheels 14 and 16 but is behind the wheel 12. The reel frame carries a rotatable reel 38 which operates to deliver swatched hay or straw forwardly and to the left, forming windrows outside the longitudinal upright plane including the wheels 12 and 16. The reel 38 derives power from the wheels 12 and 14, as will be hereinafter more fully developed.

The main frame itself is of novel construction. The design thereof will be best seen in Figure 4. This frame comprises essentially an elongated fore and aft beam 40, preferably of tubular construction, and made up of an upper intermediate, longitudinal part 42 having opposite or front and rear end portions 44 and 46, respectively. The beam 40 is of upwardly arched construction, the part 42 forming the upper part of the arch. The legs of the arch are formed respectively by front and rear leg members or elements 48 and 50, respectively, each of which is also preferably of tubular construction to conform to the upper intermediate part 42. The front leg 48 has a rear end portion 52 rigidly joined (preferably by welding) to the forward end portion 44 of the part 42. The leg 48 inclines downwardly and forwardly or lengthwise as respects the general extent of the beam 40 to provide a free end 54 which comprises a forward or front end portion of the beam 40. The rear leg 50 has a front end 56 rigidly joined (preferably by welding) to the rear end portion 46 of the upper intermediate part 42, and this leg extends downwardly and rearwardly, or in a direction lengthwise of the beam 40 and oppositely from the extent of the front leg 48. The rear leg 50 thus has a free end 58 which comprises a rear end portion on the elongated beam 40. As best seen in Figure 1, the three components 42, 48 and 50 of the elongated beam 40 lie substantially in a common, longitudinal upright plane; yet, the leg 48 and intermediate part 42 are deflected laterally out of this plane for the purpose of accommodating supporting or mounting means for the wheels 12 and 16, the details of which will be set forth below. The free ends 54 and 58 of the front and rear legs 48 and 50, respectively, lie generally in a horizontal plane disposed below the upper intermediate part 42.

The main frame 10 further includes a second or transverse beam 60 which is preferably of tubular construction and which has opposite or right- and left-hand ends 62 and 64, respectively. The left-hand end 64 is abutted against and rigidly joined to the elongated beam 40 at the junction of the leg 48 and intermediate part 42. The junction of the beams 40 and 60 is preferably accomplished by removable means including upper and lower triangular gusset plates 66 and 68 and a plurality of removable securing means such as bolts or pins 70. The opposite or right-hand end 62 of the transverse beam 60 has rigidly joined thereto (preferably by welding) a forward end portion 72 of a third or right-hand leg 74. This leg inclines downwardly and rearwardly, or in the same direction as the rear or second leg 50, to dispose a free or rear end portion 76 thereof at a point substantially midway between the free ends 54 and 58 of the first and second legs 48 and 50, respectively. The free end 76 of the leg 74 is substantially in the aforesaid horizontal plane that includes the free ends 54 and 58 of the legs 48 and 50, respectively.

The transverse or second beam 60 is substantially normal to the intermediate part 42 of the beam 40 and is also normal to the longitudinal upright plane that includes the intermediate part. Hence, as viewed from the front or rear, the transverse beam 60 is substantially at the same level as the intermediate part 42, thereby giving the frame 10 an upwardly arched intermediate portion having the three staggered legs 48, 50 and 74.

The forward or free end 54 of the leg 48 is provided with means for mounting or carrying the left-hand wheel 12. This means includes a transverse stub axle 78 rigidly fixed to the leg. Since the axle 78 is transverse, its axis is generally parallel to the transverse extent of the second or transverse beam 60. The rear end or lower end 58 of the second or rear leg 50 is provided with wheel-mounting means comprising an upright bearing 80 provided with a vertical bore 82 (Figure 2) for rotatably carrying an upright standard 84. The lower end of the standard is provided with a yoke 86 which carries a transverse axle 88 (Figures 3 and 6) for journaling the caster wheel 16.

The wheel-mounting means that effects the carrying of the leg 74 on the right-hand wheel 14 comprises complementary elements carried respectively by the leg 74 and by the wheel 16. The element on the free or lower end 76 of the leg 74 is here in the form of a bracket 90 which has a pair of apertured ears 92, the apertures being in alinement on a transverse axis which is therefore parallel to the axis of the stub axle 78.

The wheel 14 is carried on an axle 94 (Figure 3) which is in turn carried in a transversely elongated bearing 96. This bearing has rigidly fixed thereto a first pair of transversely spaced apart ears 98 which are apertured to receive a connecting pin 100. This pin, when the bearing 96 and leg 74 are assembled, passes also through the apertured ears 92 on the leg. The bearing 96 further has rigidly secured thereto a third single ear 102 which is positionable above or behind the end 76 of the leg 74. This end of the leg is apertured to receive a pin 104 which is received also by the ear 102. Thus, the wheel 14 and its components are removably carried by the lower end of the leg 74.

The reel frame 18 is suspended from or supported by the frame 10 by means including first, second and third suspension members 106, 108 and 110, respectively. These members are carried respectively by the legs 48, 50 and 74. The members 108 and 110 are respectively adjacent or proximate to the wheels 16 and 14, whereas the member 106 is relatively rearwardly remote from the left-hand wheel 12. The trailing or rear member 22 of the reel frame 18 is provided at a pair of points spaced lengthwise thereof with appropriate attaching ears 112 and 114 positioned respectively for cooperation with the frame-suspending members 108 and 110. The connection at 108—112 is completed by a removable pin or bolt 116 (Figure 3); and the connection at 110—114 is completed by a removable pin or bolt 118 (Figure 1).

The front member 20 of the reel frame 18 is provided intermediate its ends with an appropriate ear 120 positioned for alinement with the suspending member 106 on the intermediate frame part 42 (Figure 6). The arrangement of the frame-suspending means 106—122, 108—116, and 110—118, is such that the weight of the reel frame 18 is appropriately distributed among the three wheels 12, 14 and 16, while, at the same time, the maximum area is maintained at the left-hand side of the frame to permit the rake to deliver hay into windrows at that side of the rake.

The description to follow immediately will pertain to the means for driving the rotatable rake reel 38, which extends lengthwise of and is journaled in the reel frame 18. Since the reel may be of conventional construction, the details thereof will not be described.

As stated above, the transverse beam 60 is tubular or of such equivalent construction as to give it a hollow interior. The end 64 of the beam 60 is butted against the right-hand side of the tubular intermediate part 42 and the latter is provided with a bearing-receiving aperture to receive or carry a bearing 126, which is in transverse alinement with the hollow interior of the beam 60. The opposite end of the beam is provided with closure means 128 (Figure 1) having a bearing-receiving aperture that carries a bearing 130 (Figure 1). The bearings 126 and 130 are coaxial on a transverse axis which is the principal axis of the beam 60.

The bearings 126 and 130 journal a transverse shaft 132 which is thus housed or enclosed by the tubular beam 60. The shaft projects at its left-hand end and has fixed thereto a drive member in the form of a sprocket 134. The wheel 12 includes a hub 136 to which is affixed a drive member in the form of a sprocket 138. Power-transmitting means in the form of an endless belt or chain 140 is trained about or interconnects the drive members 134 and 138, thus transmitting power from the wheel 12 to the transverse shaft 132.

The opposite or right-hand end of the shaft 132 projects or is exposed at the right-hand end of the beam 60 and carries driving means including a drive member in the form of a sprocket 142. In the construction illustrated, the sprocket 142 is not keyed directly to the shaft 132 but is driven by the shaft through means including an overrunning clutch that may be of conventional design. The housing for such clutch is designated by the numeral 144. Power-transmitting means in the form of an endless chain or belt 146 is trained about the sprocket 142 and about a sprocket 148 which constitutes a drive member driven by the right-hand wheel 14. The sprocket 148 is not keyed directly to the hub of the wheel 14 but rather is driven by the wheel through means that may include an overrunning clutch of any suitable design. The purpose of the overrunning clutches in association with the sprockets 142 and 148 is, of course, to compensate for the differences in speed between the wheels 12 and 14 as the machine is operated on turns.

The bearing 96 for the wheel 14 has fixed thereto a gear case 150 which contains suitable gearing (not shown) for receiving power from the wheels 12 and 14 and for transmitting this power ultimately to the rotatable reel 38. For this purpose, the gear case 150 is provided with an output shaft 152 which extends forwardly and to the right on an axis generally parallel to the rear or trailing frame member 22 of the reel frame 18. The output shaft 152 is connected by a suitable universal joint 54 to a propeller shaft 156 which is in turn connected by an appropriate universal joint 158 to a driven shaft 160 journaled in bearings 162 and 164 adjacent the outer or right-hand corner portion of the reel frame 18. The shaft 160 is parallel to the rear or trailing member 22 of the reel frame and has its outer end projecting beyond the right-hand end member 24 of the reel frame to fixedly carry a drive member in the form of a sheave 166. The rotatable reel 38 is constrained for rotation with a driven element or shaft 168 which, like the shaft 160, is parallel to the general extent of the reel frame and which projects at the right-hand end of the reel frame. The shaft 168 carries at its projecting end a drive member in the form of a sheave 170, and a power-transmitting element in the form of a drive belt 172 is trained about or interconnects the sheaves 166 and 170. Thus, the drive components just described comprise means for receiving power from the wheels 12 and 14 and for transmitting that power ultimately to the reel 38.

In Figure 2, the drive chains 140 and 146 and the drive belt 172 have been exposed to show more clearly the arrangement and operation thereof. However, these drive elements are normally enclosed by appropriate shields. The shield for the belt 172 and sheaves 166 and 170 is designated by the numeral 174 and is best shown in Figure 3. This shield may be carried in any appropriate manner on the right-hand end of the reel frame 18. It will be noted that the connection element 28 for the right-hand draft member 32 is intermediate the sheaves 166 and 170. Therefore, the shield 174 is provided with an opening or aperture 176 for accommodating connection of the draft member 32 to the reel frame corner at 28.

The drive chains 140 and 146 respectively parallel the frame legs 48 and 74. As best shown in Figure 6, the drive chain 140 is substantially enclosed by a shield 178 which has an upper end portion substantially enclosing the drive sprocket 134. The other drive chain 146 at the right-hand side of the machine is enclosed by a shield 180 which has an upper portion substantially surrounding or enclosing the drive sprocket 142, although exposing the overrunning clutch housing 144.

The rearward or left-hand end of the reel frame is provided with adjusting means, designated by the numeral 182, for adjusting the height of the reel relative to the ground. The opposite end of the reel frame includes adjusting means, designated generally by the number 184, for effecting adjustment or feathering of the reel times, some of which are illustrated schematically and designated by the numeral 186. Both of the adjusting means just described may be of any conventional design and themselves form no part of the present invention.

The reel frame 18 is provided with a plurality of stripper bars 188. These may be of any conventional design. Since the function thereof is not unusual in the present rake, no further discussion thereof will be had.

The level of the main frame 10 relative to the ground may be adjusted by means of raising or lowering of the rear end of the main frame with respect to the caster wheel 16. As best shown in Figure 2, the upper end of the caster wheel standard 84 is provided with a bearing 190 over which is loosely fitted a cap 192. A U-shaped member 194 embraces the cap and has its legs extending downwardly respectively at opposite sides of the standard 84. These legs are connected respectively to adjusting chains 196. Each chain extends downwardly from its connection to the legs of the U-shaped member 194 and is trained about a pulley 198 and extends thence forwardly to a common connecting member 200. This member is in turn connected to a rod 202 which extends forwardly alongside the elongated beam 40. The front end of the rod is connected to a chain 204 which is in turn connected to adjusting means, designated generally by the numeral 206, carried by the transverse beam 60. This beam includes a crank 208 which may be manually operated to tighten or relax the adjusting connection 196—204. In so far as the adjusting means is concerned generally, it could be replaced by that of any other suitable design.

The operation of the rake should be apparent from the foregoing description of its construction and design. Various features of the rake have already been outlined and need no further amplification. Other objects and features of the invention not specifically enumerated herein will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. A side delivery rake, comprising: a main frame having an elongated, fore and aft extending beam of upwardly arched construction providing an upper, intermediate part having front and rear portions, a front leg rigidly fixed to the front portion and inclining downwardly and forwardly therefrom to a forward end, and a rear leg rigidly fixed to the rear portion of said intermediate part and inclining downwardly and rearwardly therefrom to a rear end, said main frame further having a transverse beam rigidly secured at one end to the fore and aft beam substantially at the junction of the intermediate part and front leg and positioned generally at the level of said intermediate part, and a third leg rigidly secured to the opposite end of the transverse beam and extending downwardly and rearwardly therefrom to provide a rear end spaced transversely from the fore and aft beam and substantially midway between the front and rear legs; wheel means sustaining the frame for forward travel over the ground, including first and second fixed-direction wheels respectively journaled on the ends of the front and third legs, and a third caster wheel journaled on the end of the rear leg; a reel frame, of generally rectangular shape as viewed from above, positioned diagonally of the main frame and lying below the transverse beam and the intermediate part of the fore and aft beam and ahead of the third leg and between the front and rear legs, said reel frame further having a front corner portion transversely spaced from and substantially in transverse alinement with the forward end of the front leg and ahead of the third leg; means supporting the reel frame on the main frame; and a draft frame at the front end of the main frame, including a pair of transversely spaced apart elements connected respectively to the aforesaid corner of the reel frame and to the aforesaid forward portion of the front leg, and further having a draft-connection element fixed to said transversely spaced elements and extending forwardly thereof to a point substantially on the longitudinal centerline between the first and second wheels.

2. The invention defined in claim 1, further characterized in that: the means for supporting the reel frame on the main frame includes first, second and third suspension members carried respectively by the intermediate part of the main frame, the rear leg and the third leg.

3. The invention defined in claim 1, further characterized in that: the first fixed-direction wheel is carried on an axle that extends transversely to one side of the front leg, the caster wheel is positioned directly at the rear end of the rear leg, and the fore and aft beam is deflected laterally from an upright longitudinal plane so that said first fixed-direction wheel and the caster wheel are in longitudinal alinement.

4. The invention defined in claim 1, further characterized in that: the reel frame carries a rotatable reel having a driven shaft adjacent the aforesaid front corner to which the draft means is attached; the third leg carries means for receiving power from the second fixed-direction wheel; and power-transmitting means is connected between said power-receiving means and said driven shaft.

5. The invention defined in claim 1, further characterized in that: the reel frame carries a rotatable reel having a driven element; a transverse shaft is journaled on the transverse beam and has drive members at opposite ends thereof respectively at the front and third legs; the first and second fixed-direction wheels have drive members respectively coaxial therewith; a pair of endless drive belts respectively connect the wheel and shaft drive members, and said belts respectively parallel the front and third legs; and power-transmitting means interconnects one wheel drive member and the reel driven element.

6. The invention defined in claim 5, further characterized in that: the transverse beam is of hollow construction and houses the transverse shaft, leaving the shaft drive members exposed at opposite ends of said shaft for connection respectively to said drive belts.

7. A side delivery rake, comprising: a main frame having an elongated, fore and aft extending beam of upwardly arched construction providing an upper, intermediate part having front and rear portions, a front leg rigidly fixed to the front portion and inclining downwardly and forwardly therefrom to a forward end, and a rear leg rigidly fixed to the rear portion of said intermediate part and inclining downwardly and rearwardly therefrom to a rear end, said main frame further having a transverse beam rigidly secured at one end to the fore and aft beam substantially at the junction of the intermediate part and front leg and positioned generally at the level of said intermediate part, and a third leg rigidly secured to the opposite end of the transverse beam and extending downwardly and rearwardly therefrom to provide a rear end spaced transversely from the fore and aft beam and substantially midway between the front and rear legs; wheel means sustaining the frame for forward travel over the ground, including first and second fixed-direction wheels respectively journaled on the ends of the front and third legs, and a third caster wheel journaled on the end of the rear leg; a reel frame, of generally rectangular shape as viewed from above, positioned diagonally of the main frame and lying below the transverse beam and the intermediate part of the fore and aft beam and ahead of the third leg and between the front and rear legs; and means suspending the reel frame from the main frame, including three suspension elements interconnecting the two frames, one element being located adjacent the second fixed-direction wheel, another adjacent the caster wheel, and a third relatively rearwardly remote from the first fixed-direction wheel.

8. A side delivery rake, comprising: a main frame having an elongated, fore and aft extending beam having front and rear end portions, a transverse beam rigidly secured at one end to the fore and aft beam, and a leg rigidly secured to the opposite end of the transverse beam and extending rearwardly therefrom to provide a rear end spaced transversely from the fore and aft beam and substantially midway between the front and rear end portions of said fore and aft beam; wheel means sustaining the frame for forward travel over the ground, including first and second fixed-direction wheels respectively journaled on the front end portion of the fore and aft beam and on the rear end of the leg, and a third caster wheel journaled on the rear end portion of the fore and aft beam; a reel frame, of generally rectangular shape as viewed from above, positioned diagonally of the main frame and lying between the leg and the front end portion of the fore and aft beam, said reel frame having a front corner portion transversely spaced from and substantially in transverse alinement with the forward end portion of the fore and aft beam and ahead of the leg; means supporting the reel frame on the main frame; and a draft frame at the front end of the main frame, including a pair of transversely spaced apart elements connected respectively to the aforesaid corner of the reel frame and to the aforesaid forward end portion of the fore and aft beam, and further having a draft-connection element fixed to said transversely spaced elements and extending forwardly thereof to a point substantially on the longitudinal centerline beween the first and second wheels.

9. The invention defined in claim 8, further characterized in that: a rake reel is rotatably carried by the reel frame and has a driven shaft adjacent said corner portion; power-transmitting means is provided for drivingly interconnecting the driven shaft and the second fixed-direction wheel, including a second shaft adjacent said corner portion of the reel frame, drive elements respectively fixed to the shafts, and endless means trained about the drive elements; and a shield enclosing the endless means, and having an opening therein to accommodate the draft element at said corner portion of the reel frame.

10. A main frame for a side delivery rake, comprising: an elongated upwardly arched beam having an upper intermediate part including opposite end portions, a first leg joined to and extending lengthwise and downwardly as a continuation of one end portion of said part, and a second leg joined to and extending lengthwise in the direction opposite from the first leg and further extending downwardly as a continuation of the other end portion of said part, said first and second legs and said intermediate part lying generally in the same lengthwise upright plane and said first and second legs having free end portions lying generally in a horizontal plane spaced below the general level of the intermediate part; a pair of wheel-mounting means secured respectively to the free end portions of the first and second legs; a second beam rigidly joined at one end to the elongated beam and extending generally normal to the elongated beam and generally normal to said upright plane; a third leg rigidly joined to the other end of the second beam and extending therefrom in the same direction as and generally parallel to the second leg, and having a free end positioned intermediate the free ends of the first and second legs and lying generally in the aforesaid horizontal plane; and a third wheel-mounting means secured to the free end of the third leg.

11. The invention defined in claim 10, further characterized in that: the second beam has a hollow interior and its end proximate to the elongated beam butts against the intermediate part of said elongated beam; and said intermediate part has a bearing-receiving aperture in alinement with the hollow interior of the second beam; and the opposite end of the second beam includes closure means having a bearing-receiving aperture coaxial with the aforesaid bearing-receiving aperture.

12. The invention defined in claim 10, further characterized in that: the main frame has a plurality of reel-frame suspending elements one on the intermediate part and one each on the second and third legs.

13. The invention defined in claim 10, further characterized in that: the wheel-mounting means on the first leg includes a stub axle parallel to but extending in the opposite lateral direction from the second beam; and the wheel-mounting means on the second leg includes an upright bearing for receiving a caster wheel standard.

14. The invention defined in claim 13, further characterized in that: the wheel-mounting means on the third leg includes a bracket element apertured on an axis parallel to that of the stub axle.

15. A main frame for a side delivery rake, comprising: an elongated, upwardly arched beam having an upper intermediate part including front and rear end portions, a first leg joined to and extending forwardly and downwardly as a continuation of the front end portion of said intermediate part, and a second leg joined to and extending rearwardly and downwardly as a continuation of the rear end portion of said intermediate part, said first and second legs and said intermediate part lying generally in the same fore-and-aft upright plane and said first and second legs having free end portions lying generally in a horizontal plane spaced below the level of the intermediate part; a second beam joined rigidly at one end to the elongated beam at the highest part of the arch thereof and extending generally normal to said elongated beam and generally normal to said upright plane; and a third leg rigidly joined to the other end of the second beam and extending downwardly and rearwardly and generally parallel to the second leg, and having a free end positioned intermediate the free ends of the first and second legs and lying generally in the aforesaid horizontal plane.

MARCUS E. McCLELLAN.

REFERENCES CITED

The following references are of record in the file of this patent:

UNITED STATES PATENTS

| Number | Name | Date |
| --- | --- | --- |
| 828,119 | Johnston | Aug. 7, 1906 |